US012786772B2

(12) United States Patent
Smith et al.

(10) Patent No.: US 12,786,772 B2
(45) Date of Patent: Nov. 3, 2026

(54) STALLING FOR MULTI-AP COORDINATION (MAPC) COMPUTE TIME

(71) Applicant: Cisco Technology, Inc., San Jose, CA (US)

(72) Inventors: Malcolm M. Smith, Richardson, TX (US); Brian Hart, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 292 days.

(21) Appl. No.: 18/585,209

(22) Filed: Feb. 23, 2024

(65) Prior Publication Data

US 2025/0274792 A1 Aug. 28, 2025

(51) Int. Cl.

*H04W 24/10* (2009.01)
*H04L 27/26* (2006.01)
*H04W 28/26* (2009.01)

(52) U.S. Cl.

CPC ......... *H04W 24/10* (2013.01); *H04L 27/2697* (2013.01); *H04W 28/26* (2013.01)

(58) Field of Classification Search

CPC ..... H04W 24/10; H04W 84/12; H04W 28/26; H04L 27/2697

See application file for complete search history.

(56) References Cited

U.S. PATENT DOCUMENTS

| | | | | |
|---|---|---|---|---|
| 7,636,302 | B2 | 12/2009 | Tyagi et al. | |
| 8,325,661 | B2 * | 12/2012 | Montojo | H04W 28/0252 370/464 |
| 11,638,202 | B2 * | 4/2023 | Cavalcanti | H04L 43/087 370/252 |

(Continued)

FOREIGN PATENT DOCUMENTS

| | | | |
|---|---|---|---|
| EP | 3863361 | A1 | 8/2021 |
| WO | 2018047738 | A1 | 3/2018 |
| WO | 2023232266 | A1 | 12/2023 |

OTHER PUBLICATIONS

Nunez, D., et al., "Multi-AP Coordinated Spatial Reuse for Wi-Fi 8: Group Creation and Scheduling", https://arxiv.org/abs/2305.04846, May 8, 2023, 6 pages.

Nunez, D., et al, "TXOP Sharing with Coordinated Spatial Reuse in Multi-AP Cooperative IEEE 802.11be WLANs," https://arxiv.org/abs/2112.00515, Dec. 21, 2021, 7 pages.

(Continued)

*Primary Examiner* — Bailor C Hsu

(74) *Attorney, Agent, or Firm* — Edell, Shapiro & Finnan, LLC

(57) ABSTRACT

A method performed by a leader wireless access point in a multiple access point coordination system. The method includes estimating a compute time for the leader wireless access point to compute a resource assignment schedule for one or more follower wireless access points; during a transmit opportunity time interval, transmitting over a wireless channel to the one or more follower wireless access points a queue report request to solicit from each of the one or more follower wireless access points a queue report response; based on the compute time, setting a deadline by which a computing component of the leader wireless access point is to complete computing the resource assignment schedule; and while the computing component is computing the resource assignment schedule, applying one or more schemes over the wireless channel to keep the wireless channel reserved from other uses until the deadline is reached.

25 Claims, 10 Drawing Sheets

(56) References Cited

U.S. PATENT DOCUMENTS

| | | | | |
|---|---|---|---|---|
| 2014/0201753 | A1* | 7/2014 | He | G06F 9/5066 718/104 |
| 2016/0338074 | A1* | 11/2016 | Chou | H04W 76/27 |
| 2017/0070765 | A1* | 3/2017 | Chang | H04N 21/6131 |
| 2018/0027443 | A1 | 1/2018 | Lee et al. | |
| 2019/0021105 | A1 | 1/2019 | Hamidi-Sepehr et al. | |
| 2019/0349986 | A1* | 11/2019 | Aijaz | H04L 5/0035 |
| 2021/0011765 | A1 | 1/2021 | Doshi et al. | |
| 2021/0410048 | A1* | 12/2021 | Yu | H04J 11/0086 |
| 2022/0417847 | A1* | 12/2022 | Cariou | H04W 72/1263 |
| 2023/0078104 | A1 | 3/2023 | Sevin et al. | |
| 2023/0083390 | A1* | 3/2023 | Salahuddeen | H04W 72/52 370/329 |
| 2023/0103807 | A1 | 4/2023 | Park et al. | |
| 2023/0208577 | A1 | 6/2023 | Yang et al. | |
| 2023/0328622 | A1* | 10/2023 | Park | H04W 16/28 370/328 |
| 2023/0422304 | A1 | 12/2023 | Sun et al. | |
| 2024/0040642 | A1* | 2/2024 | Han | H04W 76/15 |

OTHER PUBLICATIONS

Sun, Y., et al., "Considerations on Coordinated TDMA (C-TDMA)," Qualcomm Inc., https://mentor.ieee.org/802.11/dcn/23/11-23-0041-00-0uhr-considerations-on-coordinated-tdma.pptx, Jan. 2023, 14 pages.

Verma, S., et al., "A Survey on Multi-AP Coordination Approaches Over Emerging WLANS: Future Directions and Open Challenges," https://arxiv.org/abs/2306.04164, Dec. 20, 2023, 32 pages.

Wilhelmi, F., et al., "Spatial Reuse in IEEE 802.11ax WLANs," https://www.researchgate.net/publication/334360918_Spatial_Reuse_in_IEEE_80211ax_WLANs, Jul. 16, 2019, 22 pages.

Zhang, L., et al., "Multi-Access Point Coordination for Next-Gen Wi-Fi Networks Aided by Deep Reinforcement Learning," https://arxiv.org/abs/2206.11378, Jun. 22, 2022, 12 pages.

International Search Report and Written Opinion for International Application No. PCT/US2025/016193, mailed May 9, 2025, 13 pages.

* cited by examiner

500

STALLING FOR MULTI-AP COORDINATION (MAPC) COMPUTE TIME

TECHNICAL FIELD

The present disclosure relates to wireless networking.

BACKGROUND

The IEEE 802.11bn amendment of the IEEE 802.11 communication standard is planning to include a capability known as multi-access point coordination (M-AP or MAPC). As part of the MAPC architecture, there is being explored an over-the-air (OTA) shared transmit opportunity (TXOP) procedure that opens with a queue request/report exchange from the leader access point (AP) to collect queue depth information from the follower AP(s) and then in the same TXOP issue a trigger to schedule use of the channel for the follower APs. Immediately after the queue request responses are received, the leader AP computes a resource allocation schedule and then advertises the resource allocation schedule.

DESCRIPTION OF EXAMPLE EMBODIMENTS

Overview

Presented herein are techniques to facilitate reservation of a wireless channel while a leader access point or other entity computes a resource allocation schedule for one or more follower access points. In one form, a method is provided that is performed by a leader wireless access point in a multiple access point coordination system. The method includes estimating a compute time to compute a resource assignment schedule for one or more follower wireless access points; during a transmit opportunity time interval, transmitting over a wireless channel to the one or more follower wireless access points a queue report request to solicit from each of the one or more follower wireless access points a queue report response; based on the compute time, setting a deadline by which a computing component of the leader wireless access point or other entity is to complete computing the resource assignment schedule; and while the computing component or other entity is computing the resource assignment schedule, applying one or more schemes over the wireless channel to keep the wireless channel reserved from other uses until the deadline is reached.

Example Embodiments

Figure 1:
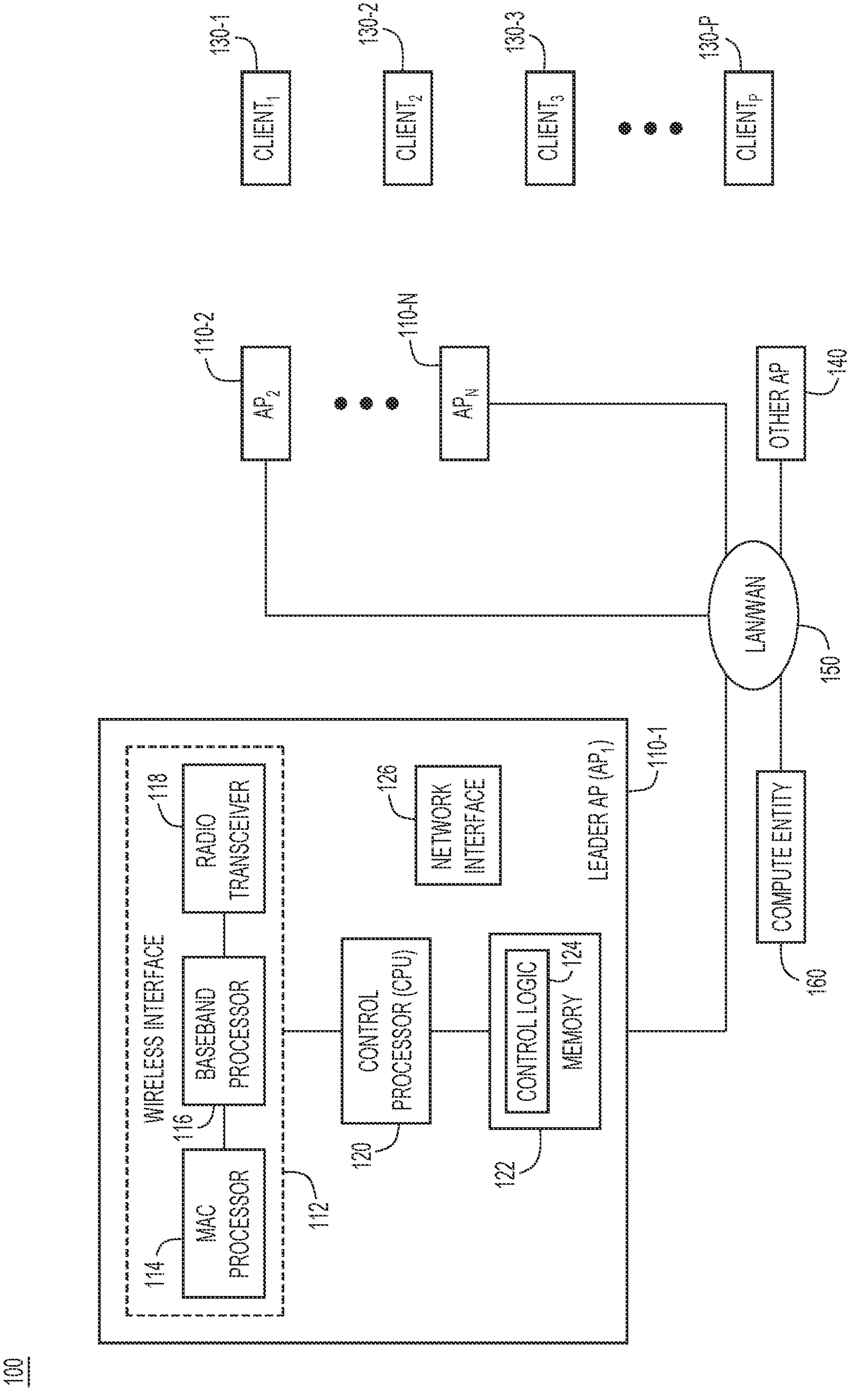
FIG. 1 is a diagram of a system employing a multi-access point coordination architecture in which a leader access point performs techniques to reserve the wireless channel while a resource allocation schedule is computed, in accordance with an example embodiment.

Reference is first made to FIG. 1, which shows a block diagram of an architecture for multiple access point coordination (MAPC) system 100. The system 100 includes a leader wireless access point (AP) 110-1 and one or more follower APs 110-2 to 110-N. The leader AP 110-1 coordinates use of a wireless channel for the leader AP 110-1 and the one or more follower APs 110-2 to 110-N in a Basic Service Set (BSS) in communicating with wireless clients 130-1, 130-2, 130-3, . . . , 130-P. FIG. 1 also shows that there may be other APs, e.g., AP 140, in the vicinity of the APs 110-1 to 110-N that are not follower APs. The APs 110-1-110-N and AP 140 may be connected to a local area network (LAN)/wide area network (WAN) 150. In addition, a compute entity 160 connected to the LAN/WAN 150 may be involved as described below. In one example, the compute entity 160 may be a WLAN controller (WLC) or other computing device (e.g., server computer) that resides on the edge of the LAN/WAN 150.

The components of the leader AP 110-1 are shown in FIG. 1, and the follower APs 110-2 to 110-N may have a similar arrangement of components. The leader AP 110-1 includes a wireless interface 112 that consists of a radio transceiver 114, a baseband processor 116 and a media access control (MAC) processor 118. The radio transceiver 114 may be implemented in one or more integrated circuits, and likewise, the baseband processor 116 and the MAC processor 118 may be implemented in one or more integrated circuits. The wireless interface 112 may be part of a "chipset" or system-on-chip arrangement. A control processor (or central processing unit (CPU)) 120 is provided that is coupled to the wireless interface 112 via a bus or other connection arrangement. The control processor or CPU 120 is connected to memory 122 that stores instructions for control logic 124. The control processor or CPU 120 may execute the instructions for the control logic 124 to perform various computation and control functions for the leader AP 110-1. The control processor or CPU 120 could be anywhere in the same box as the other components (e.g., wireless interface chipset or host chipset). While the interrupt service routine (ISR) is referred to in the below description, this is not meant to be limiting and other software architectures may be used to practice the techniques presented herein. Moreover, the leader AP 110-1 includes a network interface 126 (such one or more network interface cards) that enables wired network connectivity to the LAN/WAN 150.

In MAPC, there is an over-the-air (OTA) signaling that occurs to coordinate use of a wireless channel for a Basic Service Set (BSS). The leader AP 110-1 of the multiple APs 110-1 to 110-N seizes upon a transmit opportunity (TXOP) time interval for the wireless channel. Within that TXOP, the leader AP 110-1 sends a queue report request to the follower APs 110-2 to 110-N to report back their queue status for the wireless clients they serve, and then almost immediately sends out a scheduling request (MAPC trigger frame) to schedule resources for the follower APs that responded to the queue report request. The start of the transmission of the PHY protocol data units (PPDU) containing the scheduling request frame has to happen in a very short period of time, e.g., 16 microseconds (μsec). In non-hardware access point implementations, this can be challenging and problematic as 16 μsec (plus, in some implementations, some fraction of one or more of the duration of the PPDU's preamble, preceding MAC Protocol Data Units (MPDUs) and the MAC header) is not enough time to perform the computation.

If there are two, five ten or twenty APs in a MAPC group, and they each have queue status information, it can be challenging to compute an optimal or near-optimal allocation of resources (time allocation and number of sub-channels, etc.) in that very short period of time. This can be a substantial burden on the CPU 120 of the leader AP 110-1 or some other computing device, such as compute entity 160, to compute this information so quickly.

Figure 2A:
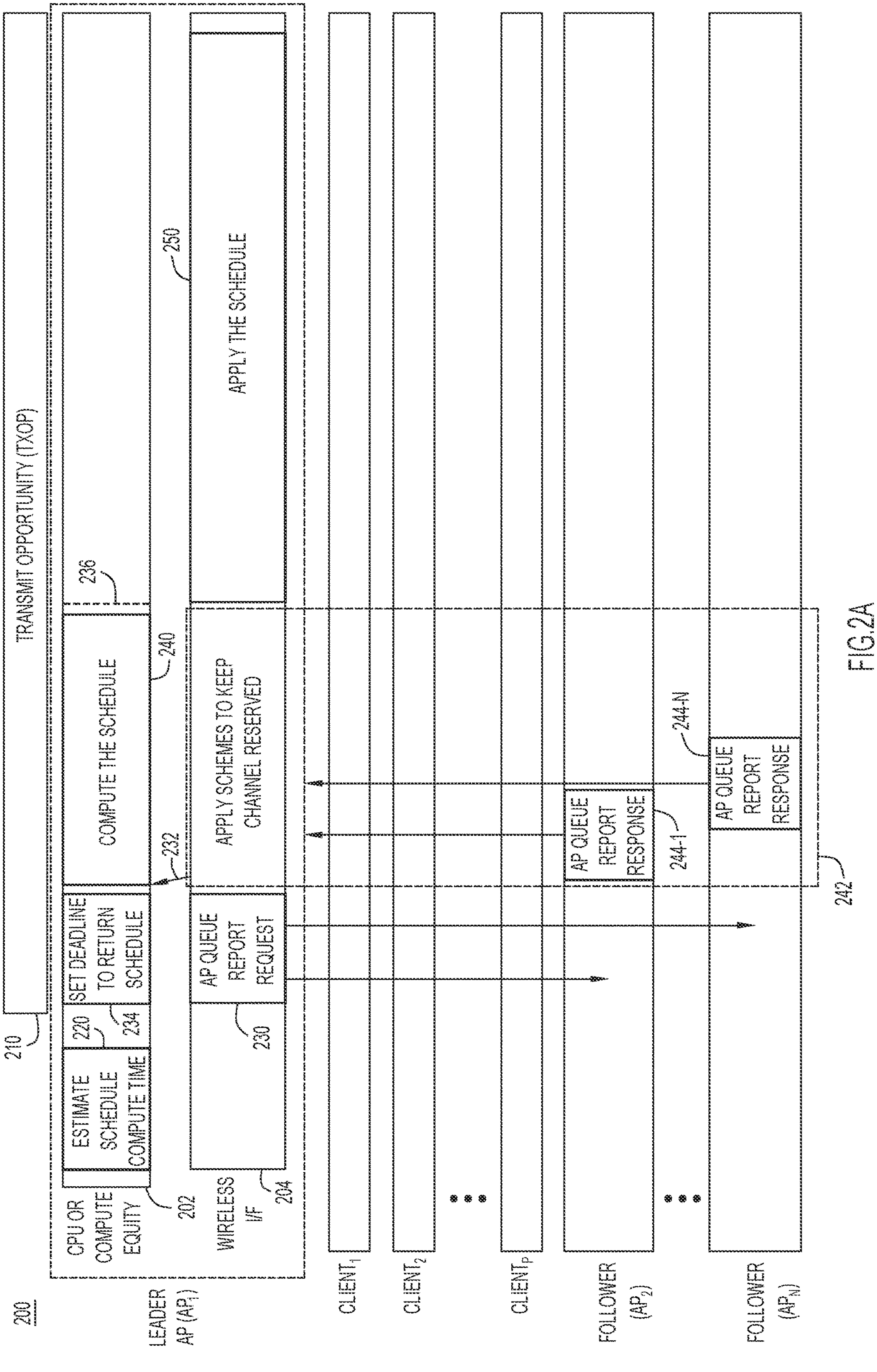
FIG. 2A shows a timing diagram by which the leader access point performs techniques to reserve the wireless channel while computing the resource allocation schedule, according to an example embodiment.

Reference is now made to FIG. 2A, with continued reference to FIG. 1. It would be desirable to give the CPU 120 (and/or compute entity 160) and the wireless interface 112 firmware enough time to compute optimal or near-optimal allocation of resources. The optimal or near optimal allocation of resources still needs to be computed in that very short period of time. The leader AP can estimate how long it will take to run the computations in order to obtain resource allocation scheduling results, e.g., 50-500 microseconds. The estimate may be used as a compute deadline. The wireless interface 112 may instruct the CPU 120 to dedicate a thread or a core/cores to compute the optimal or near-optimal allocation, using the compute deadline, or can notify the compute entity 160 regarding the compute deadline to do the same. The wireless interface 112 can stall for time on the wireless channel.

FIG. 2A shows a timing diagram 200 by which the leader AP 110-1 stalls for time, that is, reserves time on the wireless channel for the CPU of the leader AP 110-1 to compute the resource allocation schedule for the follower APs. FIG. 2A shows, separately, operational timing of the CPU 120 or compute entity 160 at 202 and of the wireless interface (I/F) 204 of the leader AP with respect to a TXOP 210.

As explained further below, the resource allocation schedule is computed for a set of N APs (e.g., 2-20 APs, including the leader AP itself) during the time interval between exchanging the queue depth discovery frame(s) and the (MAPC) trigger frame (e.g., a Multi-User Request to Send, MU-RTS, frame). The Network Allocation Vector (NAV) set by the queue request frame (or a prior frame in the same TXOP in some embodiments) may act as a time deadline to complete the resource assignment and send the MAPC trigger frame to the follower APs for their intra-BSS MAC Protocol Data Unit (MPDU) transfer.

To aid in establishing the allocation deadline and ensuring the wireless channel stays reserved for the leader AP during the compute time and available to issue the MAPC trigger frame, a procedure is presented as now described.

During the MAPC queue discovery phase, the number of APs (N) in a group (which in some embodiments includes the leader AP and in some embodiments it does not, in which case it is calculated from the number of requests sent and/or in other embodiments from the number of responses received) is determined for an upcoming/remaining TXOP. The leader AP learns this. In addition, from the queue request/report phase (or equivalent non-shared-TXOP process), the leader AP can determine the number of relevant data priority types (called relevant TIDs (T)) to schedule for in the upcoming shared TXOP. A TID is a user priority value for the type of data (video, voice, etc.).

Using the information about the number of APs (N) and the number of relevant TIDs, the leader AP 110-1 or the compute entity 160 can estimate a compute time (C) that is needed to generate the resource allocation schedule for the APs. The compute time can be pre-calibrated or learned via ongoing operating system thread timing as a function of N and T. In some instances, the value of T can be assumed (such as a maximum of 8 or 4), such that the estimation of the compute time is just based on N. In any event, the estimation of the compute time is shown at 220 in FIG. 2A. Again, this estimation could be made before the queue report/request exchange begins, or after that is completed.

At 230, the wireless interface initiates an AP queue report request (APRQ) and this may result in a NAV opening event, and at 232 interrupts the CPU (e.g., high priority interrupt service routine (ISR)) to compute the resource allocation schedule or notifies the compute entity 160 to do the same, and in the meantime, the CPU or the compute entity 160, at 234, sets a time deadline to get the computed resource allocation schedule to the wireless interface. The time deadline is shown at 236 in FIG. 2A. At 240, the CPU of the leader AP or the compute entity 160 computes the resource allocation schedule.

Simultaneously, at 242, the leader AP applies one or more schemes to keep the wireless channel reserved while the schedule is being computed. The follower APs, $AP_2$-$AP_N$, send their AP queue report responses at 244-1 and 244-N. The leader AP keeps the channel reserved with short inter-frame space (SIFS) PPDUs to extend the TXOP to the estimated deadline 236. Thereafter, at 250, the leader AP applies the schedule to the wireless channel for the follower APs.

When the scheduler ISR returns or the compute entity 160 completes computation of the resource allocation schedule, the leader AP has a set of allocated times/resource units for each follower AP, including itself, in memory. When the resource allocation schedule is computed locally by the leader AP, the resource allocation schedule can be direct memory accessed to the wireless interface for transmission to the follower APs so that it is available for use during the TXOP. When the compute entity 160 computes the resource allocation schedule, it may be sent via the LAN/WAN 150 to the leader AP for application of the schedule.

Figure 2B:
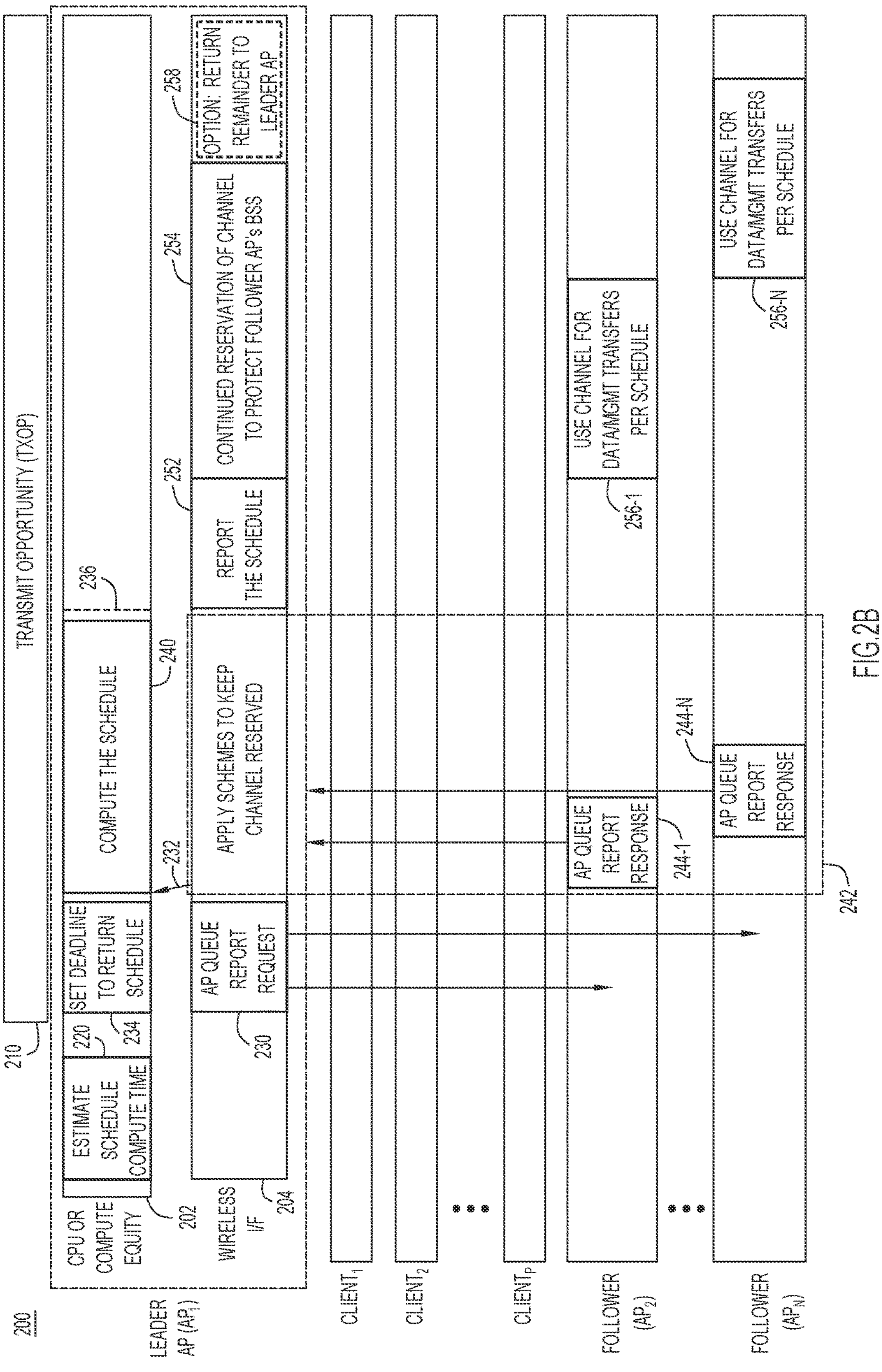
FIG. 2B is a timing diagram similar to FIG. 2A, but showing in more detail how the leader access point may continue to reserve the channel during a remainder of a transmit opportunity period, according to an example embodiment.

Turning now to FIG. 2B, a diagram is shown that is similar to FIG. 2A, but shows in more detail an example of what may be involved in applying the resource schedule shown at 250. Specifically, as shown at 252, the leader AP may report the schedule to the follower APs (e.g., using a MAPC trigger frame) and thereafter may continue reservation of the channel to protect the follower AP's BSS as shown at 254 (which may be optional). During this time of continued reservation of the channel, the follower APs may use the channel for data/management transfers (as well as control frames) according to the schedule, as shown at 256-1 and 256-N. Moreover, if there is still time remaining in the TXOP 210 after that, then optionally that time may be returned to the leader AP, as shown at 258.

As explained above, the leader AP may employ one or more schemes to reserve the wireless channel while the CPU of the leader AP 110-1 or the compute entity 160 is computing the schedule and in some cases, also for the continued reservation period 232 or 254 shown in FIG. 2B.

Figure 3A:
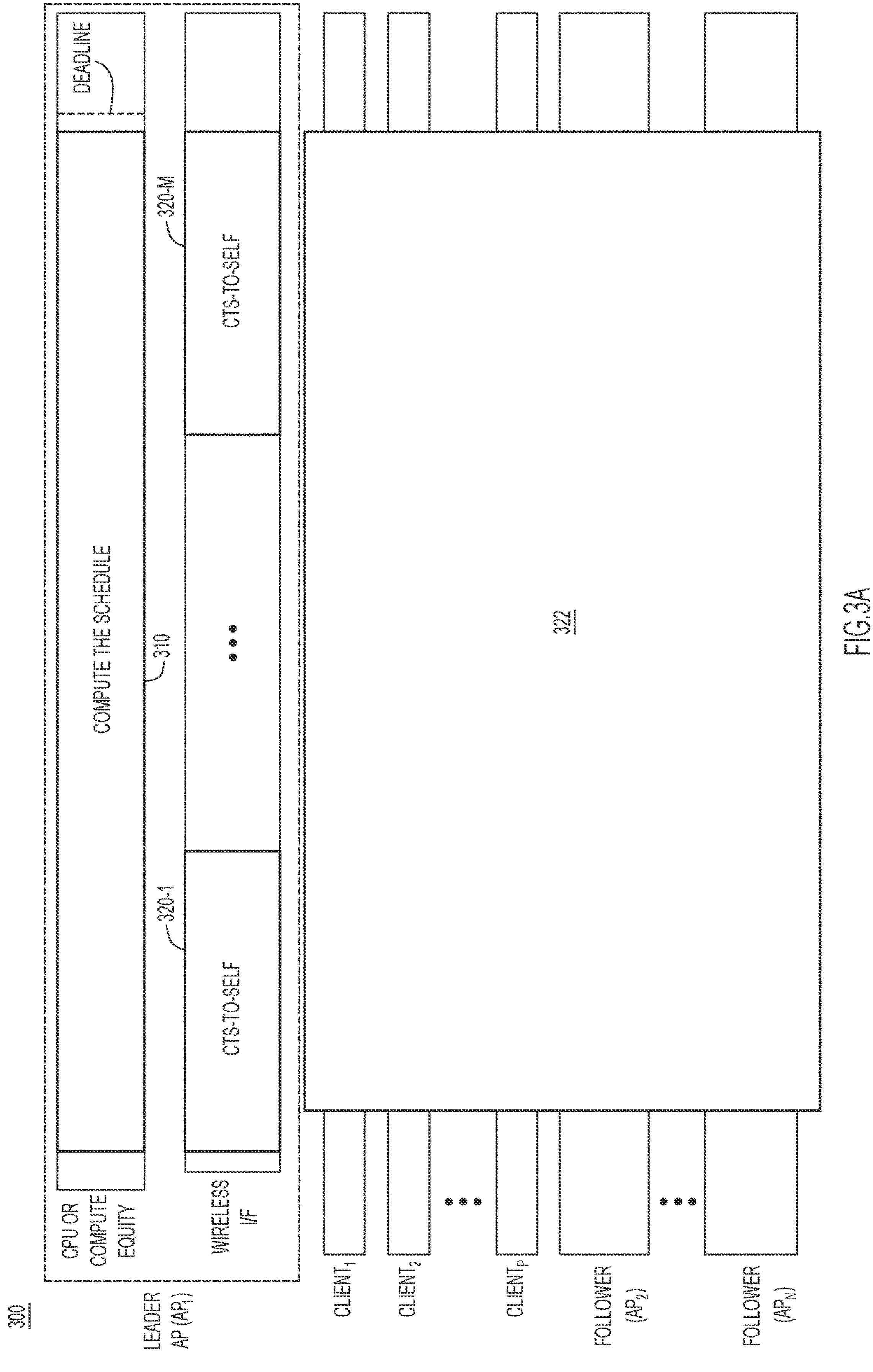
FIG. 3A illustrates a timing diagram depicting a first scheme that the leader access point may use to reserve the wireless channel while the resource allocation schedule is computed, according to an example embodiment.

FIG. 3A illustrates a timing diagram 300 depicting a first scheme. In this scheme, during the time period 310 when the CPU of the leader AP 110-1 or the compute entity 160 is computing the schedule, the wireless interface of the leader AP may send one or more Clear-to-send-to-self (CTS2Self) frames 320-1 to 320-M, which are CTS frames addressed to itself (the leader AP). Moreover, the CTS2Self frame may be sent with a suitable low complexity (low index) modulation coding scheme (MCS) if a short delay is desired. In any event, the one or more CTS2Self frames 320-1 to 320-M reserve the wireless channel as shown at 322.

Figure 3B:
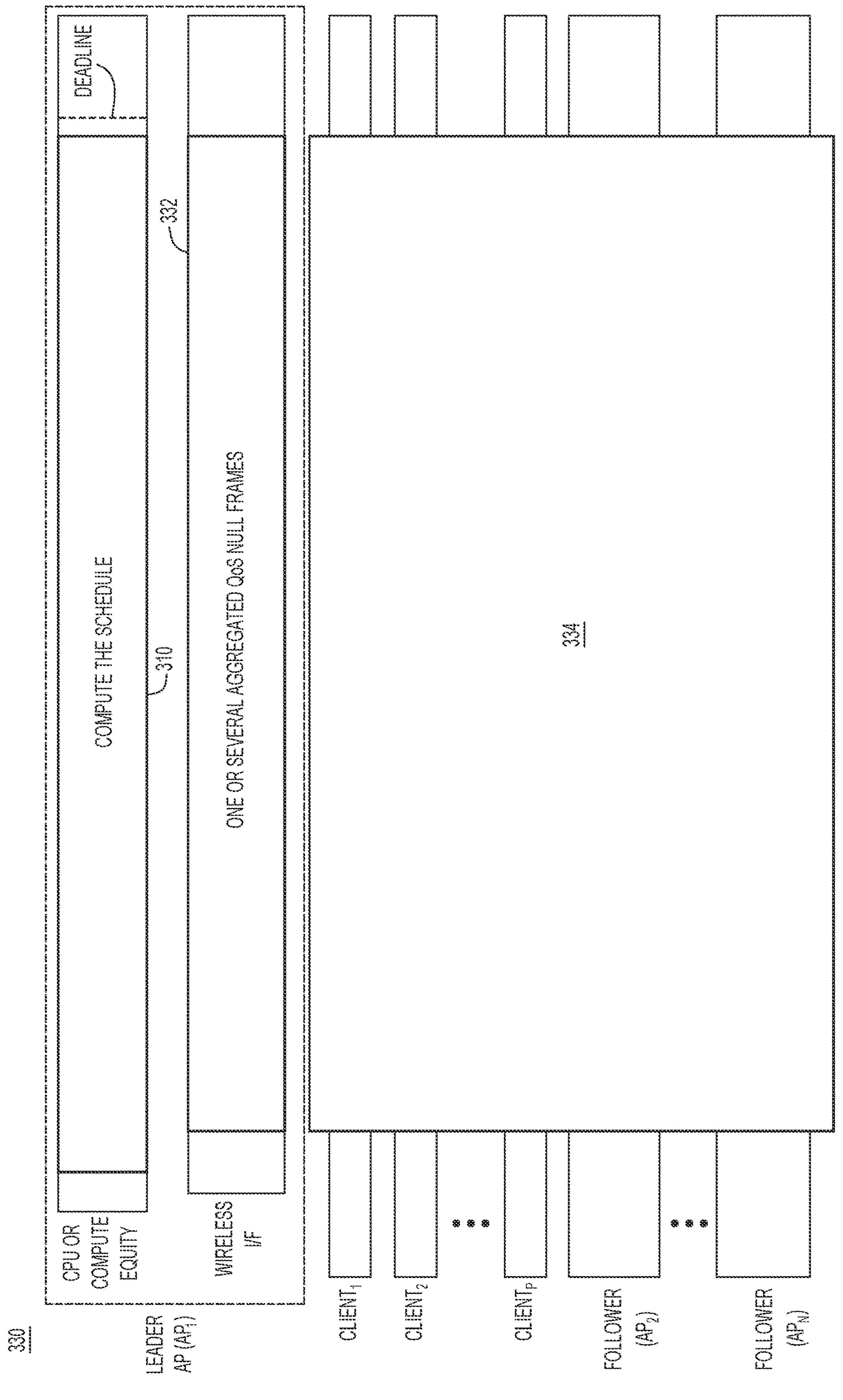
FIG. 3B illustrates a timing diagram depicting a second scheme that the leader access point may use to reserve the wireless channel while the resource allocation schedule is computed, according to an example embodiment.

FIG. 3B illustrates a timing diagram 330 for still another scheme to reserve the wireless channel. In this scheme, during the time period 310 when the CPU of the leader AP 110-1 or the compute entity 160 is computing the schedule, the wireless interface of the leader AP sends a Quality of Service (QoS) Null frame or several aggregated QoS Null frames as shown at 332. This reserves the wireless channel as shown at 334. A QoS data frame is a frame that contains QoS information, such as access category (AC), policy type and payload type. A QoS Null frame is a type of QoS frame that contains no data.

Figure 3C:
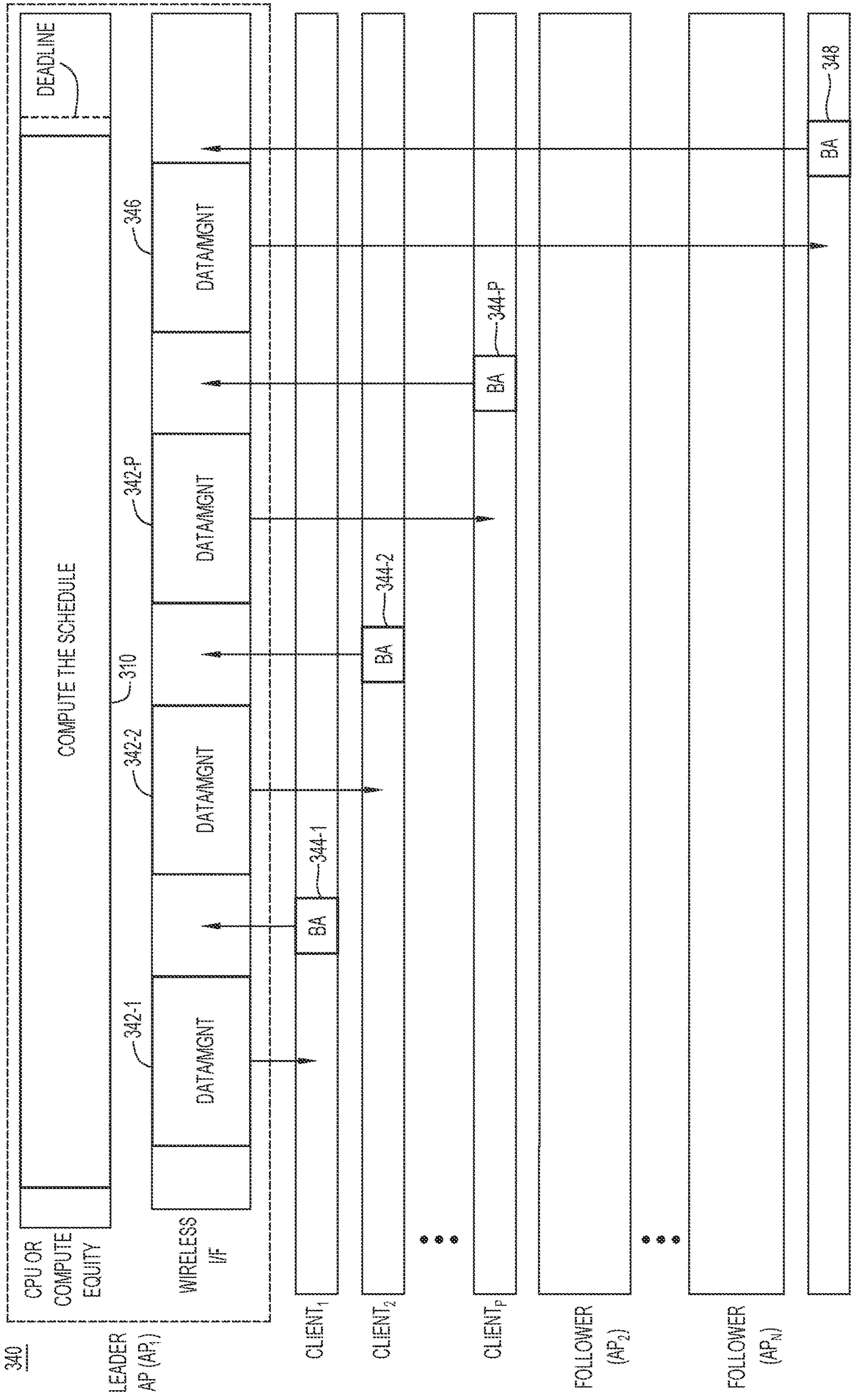
FIG. 3C illustrates a timing diagram depicting a third scheme that the leader access point may use to reserve the wireless channel while the resource allocation schedule is computed, according to an example embodiment.

FIG. 3C illustrates a timing diagram 340 for still another scheme to reserve the wireless channel. During the time period 310 when the CPU of the leader AP 110-1 or the compute entity 160 is computing the schedule, the leader AP may engage in short exchanges with other APs (ones not in the TXOP) or clients, such as data/management frames and control frames as well. FIG. 3C shows, at reference numerals 342-1, 342-2 and 342-P, the leader AP exchanging data or management frames and optionally control frames too (to allow for Request-to-Send plus Clear-to-Send or Clear-to-Send-to-Self) with client 1, client 2, . . . , client P, respectively, and with block acks (BAs) or acks being returned at 344-1, 344-2, . . . , 344-P. In addition, at 346, the leader AP may also engage in an exchange with another (non-follower) AP, which sends a BA at 348 or a follower in a different MAPC group. For example, APRQ/AQRP with MAPC Group1 then (APRQ/AQRP with MAPC Group2 and in parallel compute the MAPC Group1 schedule) then (TXOPs with MAPC Group1 and in parallel compute the MAPC Group2 schedule) then TXOPs with MAPC Group2.

Figure 3D:
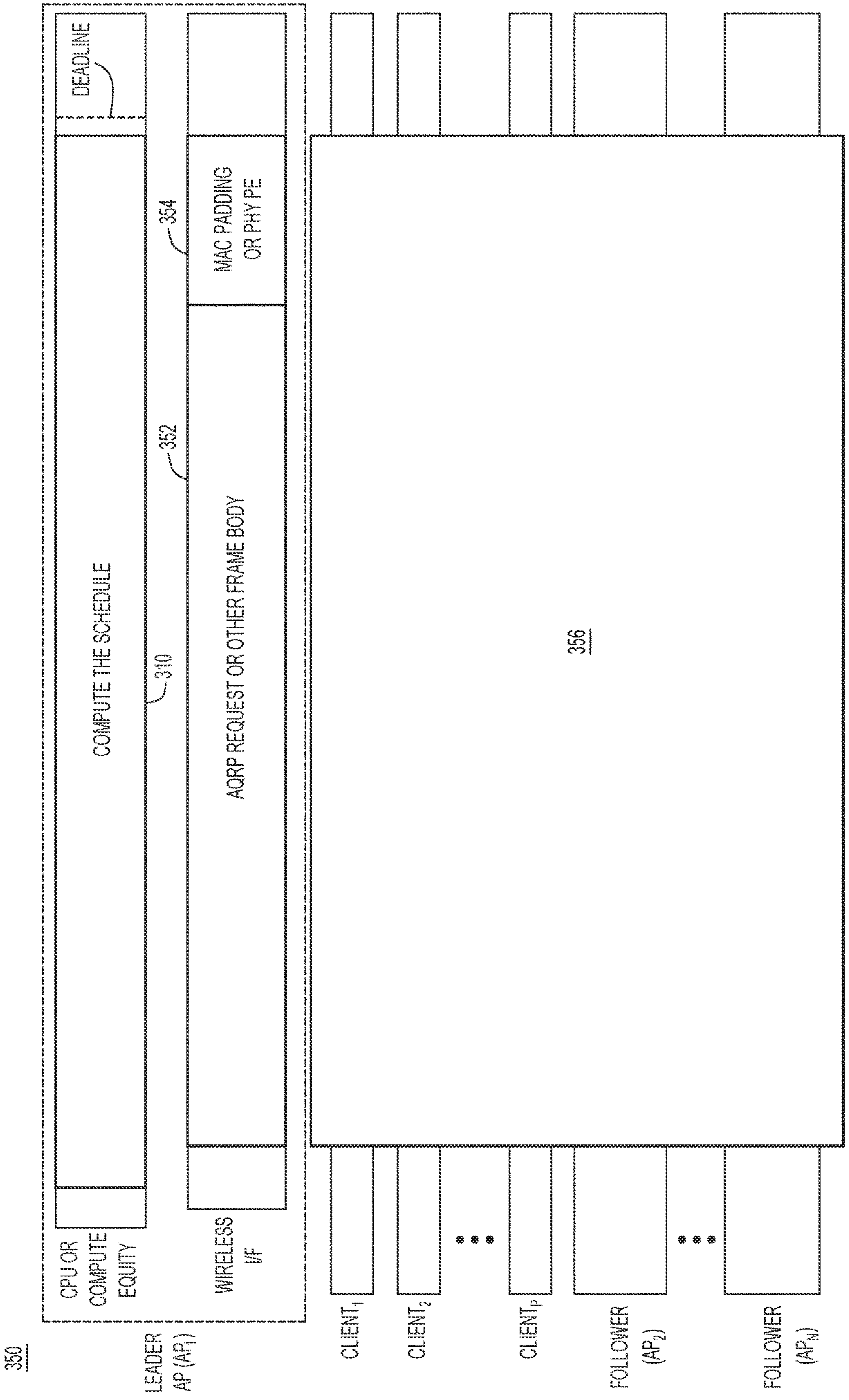
FIG. 3D illustrates a timing diagram depicting a fourth scheme that the leader access point may use to reserve the wireless channel while the resource allocation schedule is computed, according to an example embodiment.

FIG. 3D shows a timing diagram 350 for yet another scheme to reserve the channel. In this scheme, the leader AP sends a queue report request or other frame such that to the body 352 of the frame, a padding is added as shown at 354, to continue the time period 356 that the channel is reserved. The padding may be a MAC padding or a physical layer (PHY) packet extension (PE). The PHY PE may be 4, 8, 12, 16, or 20 μsec, to reach the desired duration.

Figure 3E:
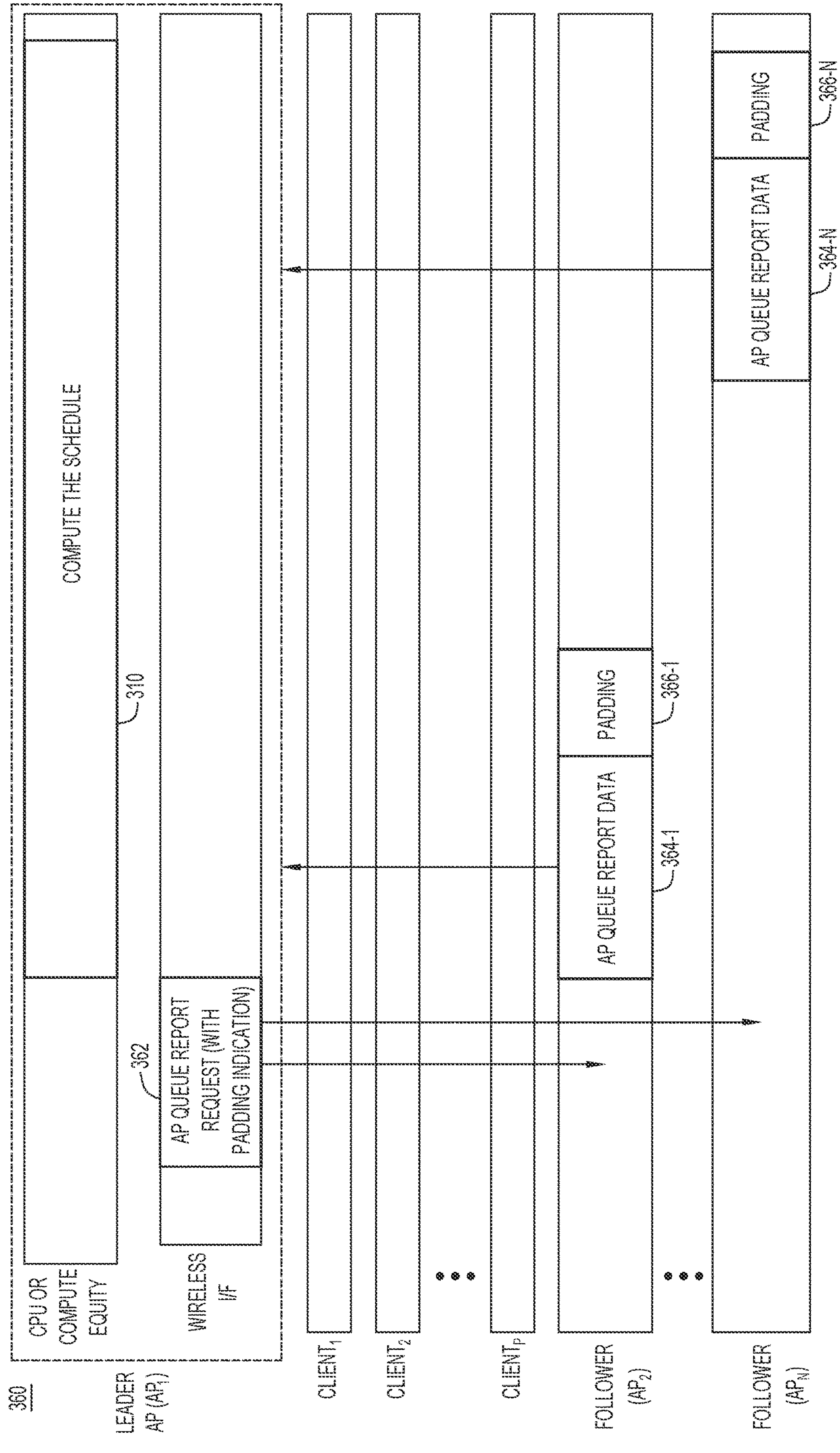
FIG. 3E illustrates a timing diagram depicting a fifth scheme that the leader access point may use to reserve the wireless channel while the resource allocation schedule is computed, according to an example embodiment.

FIG. 3E illustrates a timing diagram 360 for another scheme to reserve the channel. In this scheme, the leader AP indicates in the queue report request 362 that it sends to the follower APs the amount of padding to be added (after the requested data) in the queue report responses (or other short frames solicited by the leader AP) that each follower AP sends back to the leader AP. As a result, the follower AP(s) add padding after the content in the frames they send to the leader AP. Thus, follower AP2 sends a frame with queue report data 364-1 followed by padding 366-1, and follower APN sends queue report data 364-N followed by padding 366-N. The padding may be end-of-frame (EOF) indicators. The leader AP receives the important information (queue report data) early in the responses back from the follower APs so it (or the compute entity 160) can start using that for schedule computation. By the time the rest of the received PPDUs are processed by the leader AP, the schedule computation will likely be complete.

It should be understood that any hybrid/combination of one or more of the schemes depicted in these figures may be employed, that is one or more schemes that include one or more of (in any combination): transmitting one or more clear-to-send-to-self frames over the wireless channel; transmitting over the wireless channel one or more aggregated Quality of Service (QoS) Null frames; adding media access control (MAC) padding or a physical layer (PHY) packet extension to the queue report request; or including in the queue report request an indication of an amount of padding to be added, after the requested queue report data, in the queue report response transmitted by each of the one or more follower wireless access points.

Figure 4:
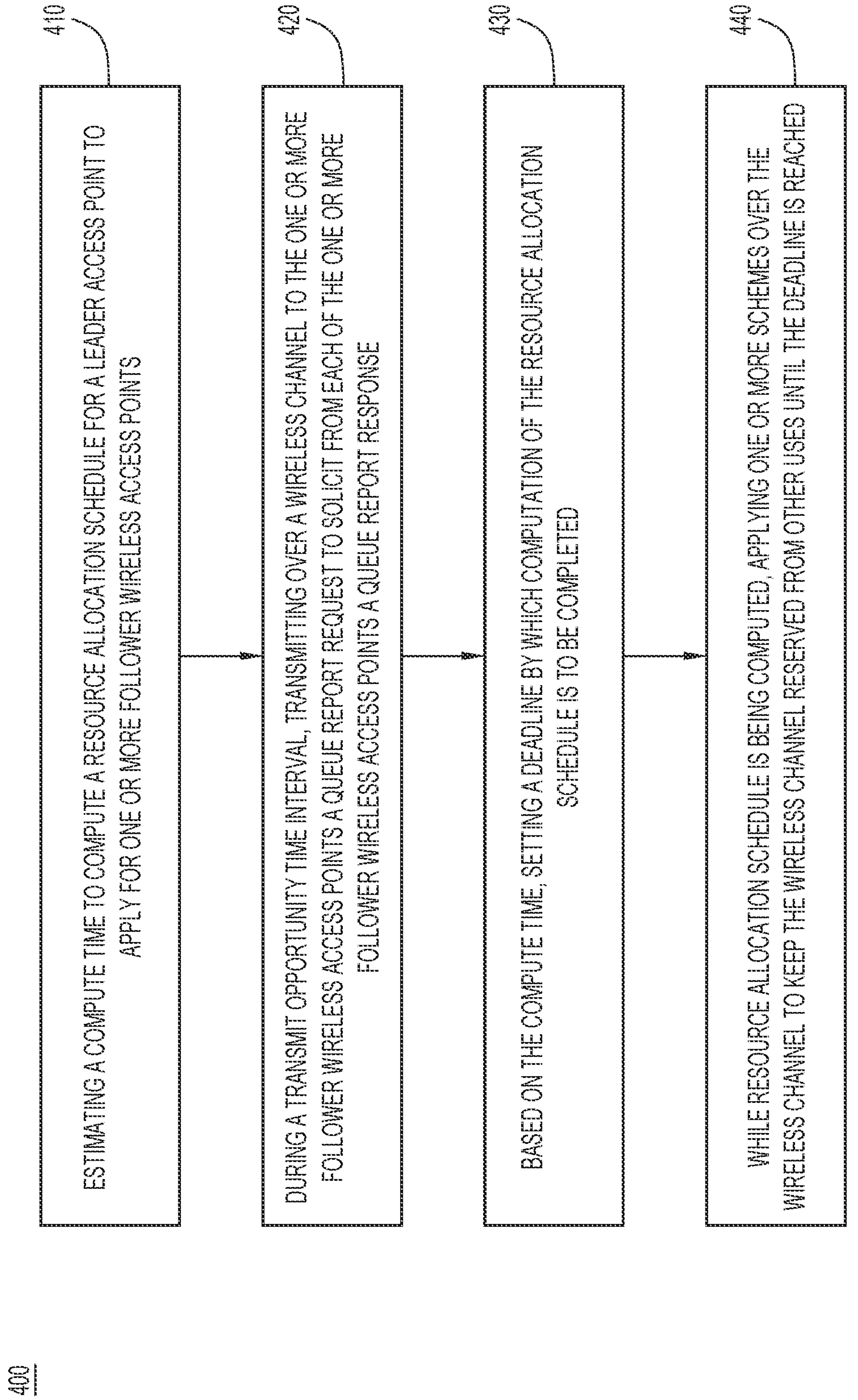
FIG. 4 shows a flow chart depicting a method performed by a leader access point, according to an example embodiment.

Reference is now made to FIG. 4. FIG. 4 shows a flow chart for a method 400 according to an example embodiment. The method 400 can be performed by a leader AP in a MAPC system. At step 410, the method 400 involves estimating a compute time for the leader wireless access point to compute a resource allocation schedule for use by the leader AP to apply for one or more follower wireless access points. This step may be performed prior to the beginning of the transmit opportunity time interval. At step 420, the method 400 involves during the transmit opportunity time interval, transmitting over a wireless channel to the one or more follower wireless access points a queue report request to solicit from each of the one or more follower wireless access points a queue report response. Step 410 could be performed in parallel with step 420 or immediately after step 420.

The method 400 involves, at step 430, based on the compute time, setting a deadline by which computation of the resource allocation schedule is to be completed. At step 440, the method 400 involves, while the resource allocation schedule is being computed, applying one or more schemes over the wireless channel to keep the wireless channel reserved from other uses until the deadline is reached.

Figure 5:
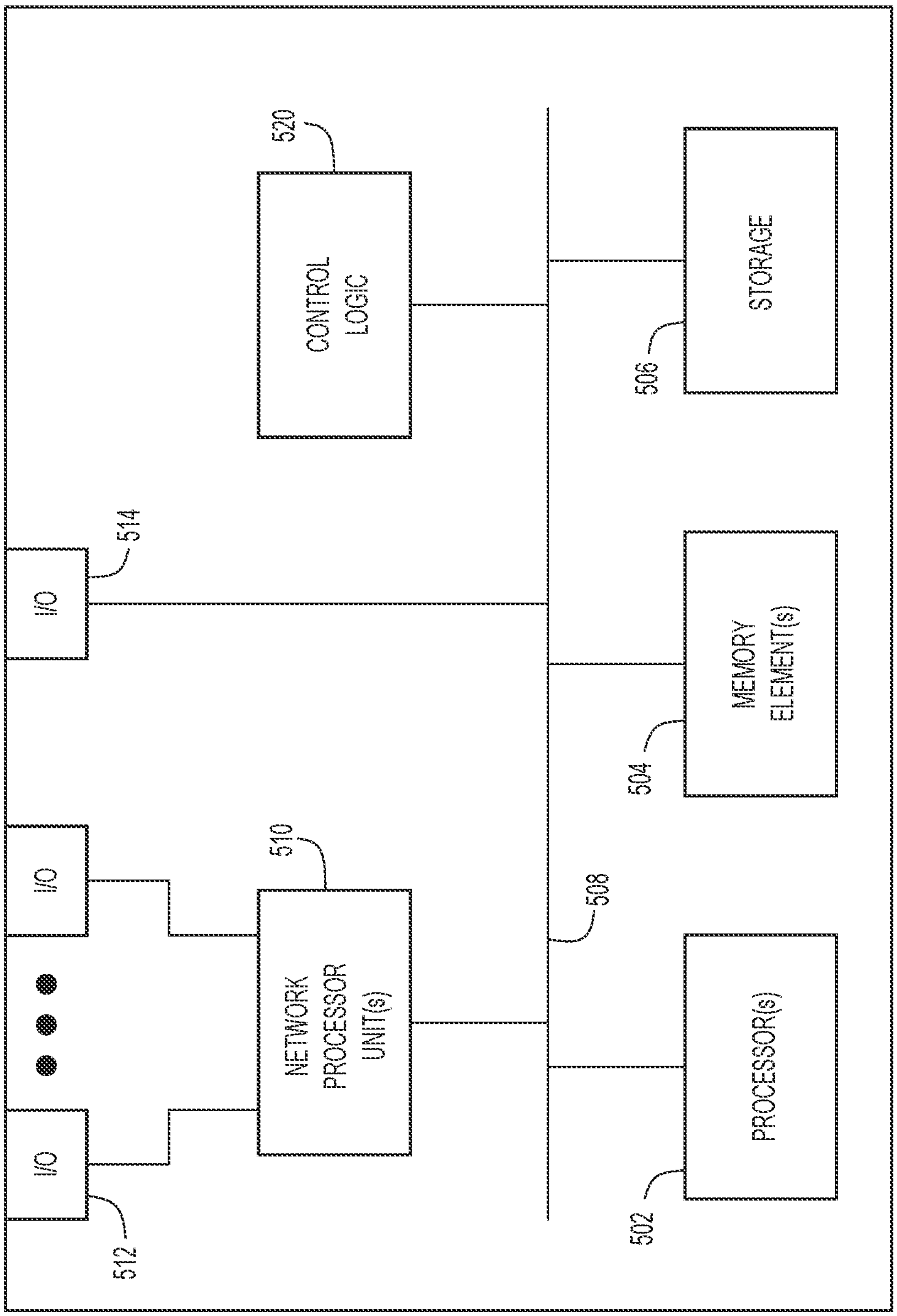
FIG. 5 is, a hardware block diagram of a device that may perform functions associated with the techniques depicted in FIGS. 1, 2A, 2B, 3A-3E and 4.

Referring to FIG. 5, a hardware block diagram is shown of a computing device 500 that may perform functions associated with operations discussed herein in connection with the techniques depicted in FIGS. 1, 2A, 2B, 3A-3E and 4. In various embodiments, a computing device, such as computing device 500 or any combination of computing devices 500, may be configured to perform the operations presented herein. The computing device 500 may be embodied as, or part of, a wireless access point configured to operate as a leader AP (at any given point in time) or as the compute entity (e.g., a wireless local area network controller) that manages operation of a wireless network.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element (s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element (s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: estimating a compute time to compute a resource allocation schedule for use by a leader wireless access point to apply for one or more follower wireless access points; during a transmit opportunity time interval, transmitting over a wireless channel to the one or more follower wireless access points a queue report request to solicit from each of the one or more follower wireless access points a queue report response; based on the compute time, setting a deadline by which computation of the resource allocation schedule is to be completed; and while the resource allocation schedule is being computed, applying one or more schemes over the wireless channel to keep the wireless channel reserved from other uses until the deadline is reached.

In some aspects, the techniques described herein relate to a method, wherein applying one or more schemes includes transmitting one or more clear-to-send-to-self frames over the wireless channel.

In some aspects, the techniques described herein relate to a method, wherein the one or more clear-to-send-to-self frames are transmitted with a relatively low complexity modulation coding scheme.

In some aspects, the techniques described herein relate to a method, wherein applying one or more schemes includes transmitting over the wireless channel one or more aggregated Quality of Service (QoS) Null frames.

In some aspects, the techniques described herein relate to a method, wherein applying one or more schemes includes engaging over the wireless channel in exchanges with one or more client devices or one or more other wireless access points that are not the one or more follower wireless access points.

In some aspects, the techniques described herein relate to a method, wherein applying one or more schemes includes adding media access control (MAC) padding or a physical layer (PHY) packet extension to the queue report request.

In some aspects, the techniques described herein relate to a method, wherein applying the one or more schemes includes including in the queue report request an indication of an amount of padding to be added, after requested queue report data, in the queue report response transmitted by each of the one or more follower wireless access points.

In some aspects, the techniques described herein relate to a method, further including, after the deadline, applying the resource allocation schedule during the transmit opportunity time interval.

In some aspects, the techniques described herein relate to a method, wherein applying the resource allocation schedule includes: transmitting the resource allocation schedule to the one or more follower wireless access points.

In some aspects, the techniques described herein relate to a method, further including: continuing reservation of the wireless channel to protect use of the wireless channel by the one or more follower wireless access points for data or management transfers per the resource allocation schedule.

In some aspects, the techniques described herein relate to a method, wherein estimating the compute time is based on one or more of: a number of the one or more follower wireless access points determined during a discovery phase; the number of responding follower wireless access points; a fixed number of priorities for a type of data; or a selected number of priorities for a type of data.

In some aspects, the techniques described herein relate to a method, wherein estimating the compute time and computing the resource allocation schedule are performed by a computing component of the leader wireless access point.

In some aspects, the techniques described herein relate to a method, wherein estimating the compute time and computing the resource allocation schedule are performed by a compute entity separate from the leader wireless access point.

In some aspects, the techniques described herein relate to an apparatus including: a wireless interface configured to enable wireless communication on behalf of a leader wireless access point in a multiple access point coordination system; and a processor coupled to the wireless interface, the processor configured to set a deadline by which a resource allocation schedule is to be computed for one or more follower wireless access points; wherein the wireless interface is configured to: during a transmit opportunity time interval, transmit over a wireless channel to the one or more follower wireless access points a queue report request to solicit from each of the one or more follower wireless access points a queue report response; and while the resource allocation schedule is being computed, apply one or more schemes over the wireless channel to keep the wireless channel reserved from other uses until the deadline is reached.

In some aspects, the techniques described herein relate to an apparatus, wherein the wireless interface is configured to apply the one or more schemes that include one or more of: transmitting one or more clear-to-send-to-self frames over the wireless channel; transmitting over the wireless channel one or more aggregated Quality of Service (QoS) Null frames; adding media access control (MAC) padding or a physical layer (PHY) packet extension to the queue report request; or including in the queue report request an indication of an amount of padding to be added, after requested queue report data, in the queue report response transmitted by each of the one or more follower wireless access points.

In some aspects, the techniques described herein relate to an apparatus, wherein the wireless interface is configured to, after the deadline, apply the resource allocation schedule during the transmit opportunity time interval.

In some aspects, the techniques described herein relate to an apparatus, wherein the wireless interface is configured to apply the resource allocation schedule by: transmitting the resource allocation schedule to the one or more follower wireless access points.

In some aspects, the techniques described herein relate to an apparatus, wherein the wireless interface is further configured to continue reservation of the wireless channel to protect use of the wireless channel by the one or more follower wireless access points for data or management transfers per the resource allocation schedule.

In some aspects, the techniques described herein relate to an apparatus, wherein the processor is configured to estimate a compute time of the resource allocation schedule in order to set the deadline, and to compute the resource allocation schedule.

In some aspects, the techniques described herein relate to an apparatus, wherein the resource allocation schedule is computed by a computing entity separate from the apparatus and in network communication with the apparatus.

In some aspects, the techniques described herein relate to a system including: a plurality of wireless access points including a leader wireless access point and one or more follower wireless access points configured to operate as a multi-access point coordination group, wherein the leader wireless access point is configured to: set a deadline by which a resource allocation schedule is to be computed for the one or more follower wireless access points; during a transmit opportunity time interval, transmit over a wireless channel to the one or more follower wireless access points a queue report request to solicit from each of the one or more follower wireless access points a queue report response; and while the resource allocation schedule is being computed, apply one or more schemes over the wireless channel to keep the wireless channel reserved from other uses until the deadline is reached.

In some aspects, the techniques described herein relate to a system, wherein the leader wireless access point is configured to apply the one or more schemes that include one or more of: transmitting one or more clear-to-send-to-self frames over the wireless channel; transmitting over the wireless channel one or more aggregated Quality of Service (QoS) Null frames; adding media access control (MAC) padding or a physical layer (PHY) packet extension to the queue report request; or including in the queue report request an indication of an amount of padding to be added, after requested queue report data, in the queue report response transmitted by each of the one or more follower wireless access points.

In some aspects, the techniques described herein relate to a system, wherein the leader wireless access point is configured to apply the resource allocation schedule during the transmit opportunity time interval by: transmitting the resource allocation schedule to the one or more follower wireless access points.

In some aspects, the techniques described herein relate to a system, wherein the leader wireless access point or another access point of the plurality of wireless access points is further configured to continue reservation of the wireless channel to protect use of the wireless channel by the one or more follower wireless access points for data or management transfers per the resource allocation schedule.

In some aspects, the techniques described herein relate to a system, wherein the leader wireless access point is configured to estimate a compute time of the resource allocation schedule in order to set the deadline, and to compute the resource allocation schedule.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method performed by a computing component of a leader wireless access point or by a compute entity separate from the leader wireless access point, the method comprising:

estimating a compute time to compute a resource allocation schedule for use by the leader wireless access point to apply for one or more follower wireless access points;

during a transmit opportunity time interval, transmitting over a wireless channel to the one or more follower wireless access points a queue report request to solicit from each of the one or more follower wireless access points a queue report response;

based on the compute time, setting a deadline by which computation of the resource allocation schedule is to be completed; and while the resource allocation schedule is being computed, applying one or more schemes over the wireless channel to keep the wireless channel reserved from other uses until the deadline is reached.

2. The method of claim 1, wherein applying one or more schemes includes transmitting one or more clear-to-send-to-self frames over the wireless channel.

3. The method of claim 2, wherein the one or more clear-to-send-to-self frames are transmitted with a relatively low complexity modulation coding scheme.

4. The method of claim 1, wherein applying one or more schemes includes transmitting over the wireless channel one or more aggregated Quality of Service (QoS) Null frames.

5. The method of claim 1, wherein applying one or more schemes includes engaging over the wireless channel in exchanges with one or more client devices or one or more other wireless access points that are not the one or more follower wireless access points.

6. The method of claim 1, wherein applying one or more schemes includes adding media access control (MAC) padding or a physical layer (PHY) packet extension to the queue report request.

7. The method of claim 1, wherein applying the one or more schemes comprises including in the queue report request an indication of an amount of padding to be added, after requested queue report data, in the queue report response transmitted by each of the one or more follower wireless access points.

8. The method of claim 1, further comprising, after the deadline, applying the resource allocation schedule during the transmit opportunity time interval.

9. The method of claim 8, wherein applying the resource allocation schedule includes:

transmitting the resource allocation schedule to the one or more follower wireless access points.

10. The method of claim 9, further comprising:

continuing reservation of the wireless channel to protect use of the wireless channel by the one or more follower wireless access points for data or management transfers per the resource allocation schedule.

11. The method of claim 1, wherein estimating the compute time is based on one or more of: a number of the one or more follower wireless access points determined during a discovery phase; a number of responding follower wireless access points; a fixed number of priorities for a type of data; or a selected number of priorities for a type of data.

12. The method of claim 1, wherein estimating the compute time and computing the resource allocation schedule are performed by the computing component of the leader wireless access point.

13. The method of claim 1, wherein estimating the compute time and computing the resource allocation schedule are performed by the compute entity separate from the leader wireless access point.

14. An apparatus comprising:

a wireless interface configured to enable wireless communication on behalf of a leader wireless access point in a multiple access point coordination system; and a processor coupled to the wireless interface, the processor configured to set a deadline by which a resource allocation schedule is to be computed for one or more follower wireless access points;

wherein the wireless interface is configured to:

during a transmit opportunity time interval, transmit over a wireless channel to the one or more follower wireless access points a queue report request to solicit from each of the one or more follower wireless access points a queue report response; and while the resource allocation schedule is being computed, apply one or more schemes over the wireless channel to keep the wireless channel reserved from other uses until the deadline is reached.

15. The apparatus of claim 14, wherein the wireless interface is configured to apply the one or more schemes that include one or more of: transmitting one or more clear-to-send-to-self frames over the wireless channel; transmitting over the wireless channel one or more aggregated Quality of Service (QOS) Null frames; adding media access control (MAC) padding or a physical layer (PHY) packet extension to the queue report request;

or including in the queue report request an indication of an amount of padding to be added, after requested queue report data, in the queue report response transmitted by each of the one or more follower wireless access points.

16. The apparatus of claim 14, wherein the wireless interface is configured to, after the deadline, apply the resource allocation schedule during the transmit opportunity time interval.

17. The apparatus of claim 16, wherein the wireless interface is configured to apply the resource allocation schedule by:

transmitting the resource allocation schedule to the one or more follower wireless access points.

18. The apparatus of claim 17, wherein the wireless interface is further configured to continue reservation of the wireless channel to protect use of the wireless channel by the one or more follower wireless access points for data or management transfers per the resource allocation schedule.

19. The apparatus of claim 14, wherein the processor is configured to estimate a compute time of the resource allocation schedule in order to set the deadline, and to compute the resource allocation schedule.

20. The apparatus of claim 14, wherein the resource allocation schedule is computed by a computing entity separate from the apparatus and in network communication with the apparatus.

21. A system comprising:

a plurality of wireless access points including a leader wireless access point and one or more follower wireless access points configured to operate as a multi-access point coordination group, wherein the leader wireless access point is configured to:

set a deadline by which a resource allocation schedule is to be computed for the one or more follower wireless access points;

during a transmit opportunity time interval, transmit over a wireless channel to the one or more follower wireless access points a queue report request to solicit from each of the one or more follower wireless access points a queue report response; and while the resource allocation schedule is being computed, apply one or more schemes over the wireless channel to keep the wireless channel reserved from other uses until the deadline is reached.

22. The system of claim 21, wherein the leader wireless access point is configured to apply the one or more schemes that include one or more of: transmitting one or more clear-to-send-to-self frames over the wireless channel; transmitting over the wireless channel one or more aggregated Quality of Service (QoS) Null frames; adding media access control (MAC) padding or a physical layer (PHY) packet extension to the queue report request; or including in the queue report request an indication of an amount of padding to be added, after requested queue report data, in the queue report response transmitted by each of the one or more follower wireless access points.

23. The system of claim 21, wherein the leader wireless access point is configured to apply the resource allocation schedule during the transmit opportunity time interval by:

transmitting the resource allocation schedule to the one or more follower wireless access points.

24. The system of claim 23, wherein the leader wireless access point or another access point of the plurality of wireless access points is further configured to continue reservation of the wireless channel to protect use of the wireless channel by the one or more follower wireless access points for data or management transfers per the resource allocation schedule.

25. The system of claim 21, wherein the leader wireless access point is configured to estimate a compute time of the resource allocation schedule in order to set the deadline, and to compute the resource allocation schedule.

* * * * *